United States Patent [19]

Harboe

[11] 4,086,758
[45] May 2, 1978

[54] COMBINED STEAM AND GAS TURBINE PLANT AND METHOD OF OPERATION

[75] Inventor: Henrik Harboe, Kingston, England

[73] Assignee: Stal-Laval Turbin AB, Finspong, Sweden

[21] Appl. No.: 720,530

[22] Filed: Sep. 7, 1976

[30] Foreign Application Priority Data

Sep. 12, 1975 Sweden .................................. 7510166

[51] Int. Cl.² ........................... F02C 7/02; F02C 3/26
[52] U.S. Cl. ................................ 60/39.02; 60/39.18 B; 60/39.46 S; 122/4 D
[58] Field of Search ......... 60/39.12, 39.18 B, 39.46 S, 60/655, 39.02, 39.18 A; 110/28 J; 122/4 D, 33

[56] References Cited
U.S. PATENT DOCUMENTS

| 2,162,746 | 6/1939 | Randell | 122/33 |
| 2,225,310 | 12/1970 | Lindhagen et al. | 60/39.46 S |
| 3,446,012 | 5/1969 | Foster-Pegg | 60/39.12 |
| 3,687,115 | 8/1972 | Bell | 60/39.18 B |

Primary Examiner—Carlton R. Croyle
Assistant Examiner—L. J. Casaregola
Attorney, Agent, or Firm—Pollock, Vande Sande & Priddy

[57] ABSTRACT

Steam and gas turbines share a common heat source according to the invention. A fluidized bed combustion chamber provides hot gas for the gas turbine and a heat source for a gaseous heat exchange medium which transfers heat to the steam turbine. Air flow from the gas turbine compressor is used to help control the temperature of the hot gases in the fluidized bed and may also be used as the heat exchange medium for the steam turbine. Controls for air flow and pressure are provided to accommodate variations in power demand. A method of operating such a plant is also disclosed.

10 Claims, 1 Drawing Figure

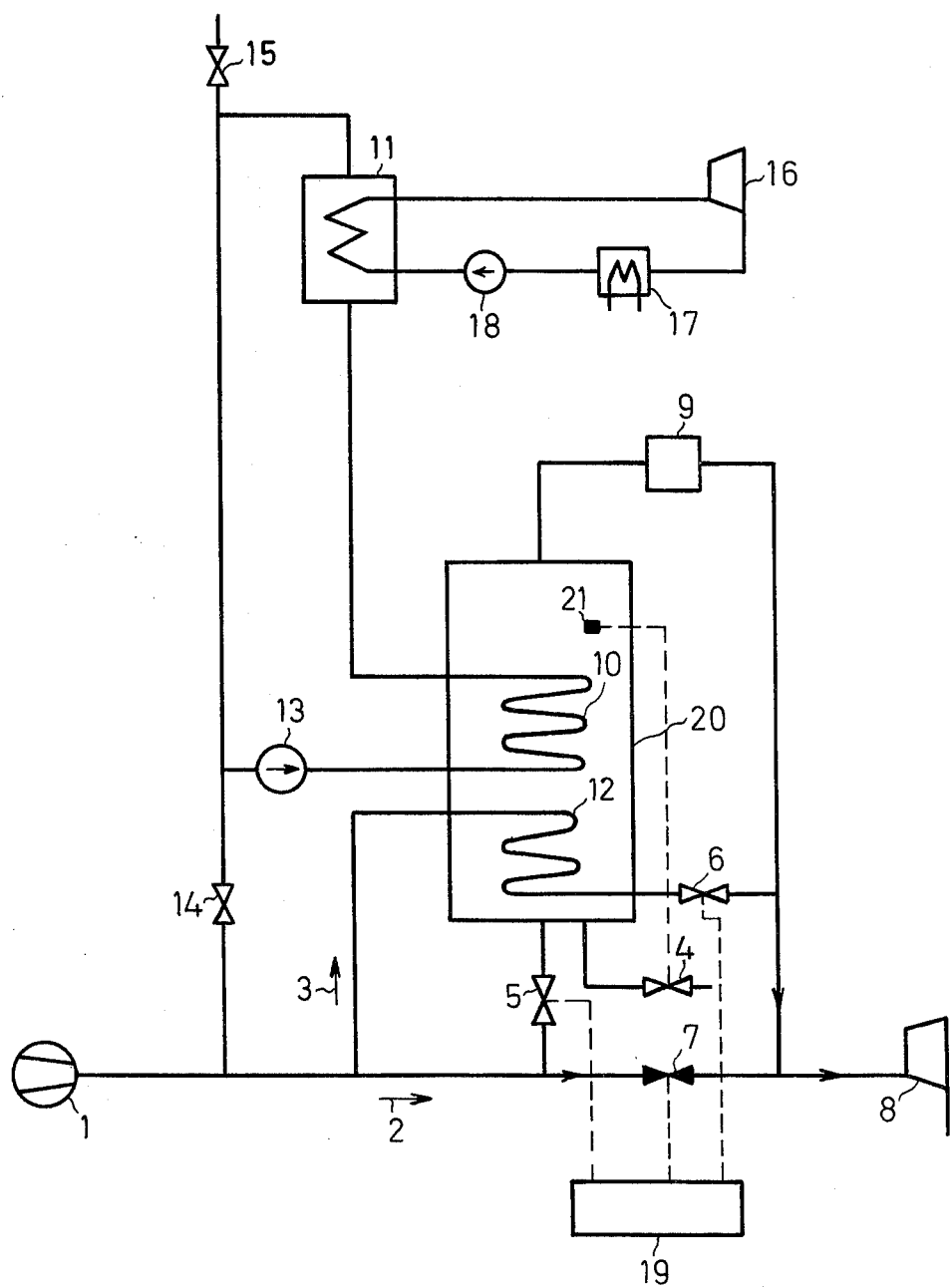

COMBINED STEAM AND GAS TURBINE PLANT AND METHOD OF OPERATION

BACKGROUND OF THE INVENTION

Combined steam and gas turbine plants have been proposed for many different applications, the usual advantage being utilizing the residual heat from the gas turbine as a heat input to the steam generator of the steam turbine, thereby improving total efficiency and economy. Further, the fluidized bed combustion chamber has proved to possess qualities which make it advantageous for gas turbine operation. However, for direct steam generation by placing a steam generator coil in the fluidized bed to produce steam for turbine operation, the fluidized bed combustion chamber has proved to be less suitable than more conventional boilers, due to the difficulty in regulating the load in the fluidized bed during periods of low demand on the steam turbine.

OBJECTS OF THE INVENTION

An object of the invention is to provide a power plant having combined steam and gas turbine portions, wherein the excess heat from the gas turbine is used efficiently for the steam turbine.

Another object of the invention is to provide such a power plant in which the gas turbine uses a fluidized bed combustion chamber and the steam turbine is driven by steam generated with heat absorbed from the fluidized bed.

A further object of the invention is to provide such a power plant in which the steam turbine is heated by indirect heat transfer to a gaseous heat transfer medium heated by the combustion chamber of the gas turbine.

Yet another object of the invention is to provide such a power plant in which the pressure and flow rate of the heat transfer medium for the steam turbine may be regulated in response to changes in system loadings.

A still further object of the invention is to provide a method of operating a combined steam turbine and gas turbine plant.

These objects are given only by way of example. Thus, other objects and advantages inherently achieved by the invention may be apparent to those skilled in the art. Nonetheless, the scope of the invention is to be limited only by the appended claims.

SUMMARY OF THE INVENTION

According to the present invention it is therefore proposed to arrange indirect heat transmission from the combustion chamber of the gas turbine to the steam generator of the steam turbine by means of a separate heat transmission circuit. In this way the fluidized bed combustion chamber can be used in the combined plant without the drawbacks caused by water cooling. Flow and pressure in the separate heat transmission circuit are regulated to enable the system to follow demand changes. In some embodiments, the gas turbine compressor provides both the combustion air for the gas turbine and the separate heat transfer medium for the steam turbine.

BRIEF DESCRIPTION OF THE DRAWING

The FIGURE shows a schematic representation of a combined gas turbine and steam turbine plant according to the invention.

DESCRIPTION OF THE PREFERRED EMBODIMENT

Air is introduced to the plant by a compressor 1. Air flow is divided into two paths, combustion air in conduit 2 and cooling air in conduit 3 leading to primary cooling coil or heat exchanger 12. Fuel is supplied to the bottom of a conventional fluidized bed combustion chamber 20 via a flow regulating valve 4. A temperature-sensitive member 21 is provided which controls valve 4 in accordance with the temperature of fluidized bed 20 to keep said temperature essentially constant at a desired value by regulating the rate of combustion.

Air distribution also is controlled by valves 5, 6 and 7. Valve 5 is regulated to maintain the fluidizing rate and level of combustion in the fluidized bed within desirable limits; whereas, valves 6 and 7 are regulated to control the mixture temperature of the mixture of combustion gases and air flowing to a gas turbine 8. Thus the gas turbine power is controlled by valves 6 and 7. The flue gas from fluidized bed 20 passes through a precipitator 9, which may be of the cyclonic type, prior to flowing through turbine 8. Valves 5–7 preferably are controlled by a master regulator device 19 of a conventional kind.

A secondary cooling circuit is provided comprising a bundle of tubes or secondary heat exchanger 10 located within the fluidized bed. A gaseous medium such as air is passed through tubes 10 and heated to a temperature preferably in the range of 600–700° C. This high temperature gas then flows to a steam generator 11 which is connected on its steam side to a conventional steam turbine system having a turbine 16, condenser 17 and feed pump 18. The gaseous medium in the secondary cooling circuit is then returned to fluidized bed 20 for re-heating. For the circulation of the gaseous medium, a fan or pump 13 is provided, the flow of which can be varied for regulating the rate of steam generation in steam generator 11.

If the gaseous medium is air, the secondary circuit can be put into connection with the primary circuit through a conduit with a valve 14, so that the pressure levels in both circuits follow each other in case of changes of the load. A valve 15 makes it possible rapidly to reduce the pressure in the secondary circuit by discharging into the atmosphere, which may be necessary, for example in case of load drops.

Having described my invention in sufficient detail to enable those skilled in the art to make and use it, I claim:

1. A combined steam and gas turbine plant, comprising:
   a gas turbine;
   a fluidized bed combustion chamber for providing hot gas for said gas turbine;
   a steam turbine;
   a steam generator for providing steam for said steam turbine;
   a primary heat exchanger immersed in said chamber for heating air flowing to said gas turbine;
   a secondary heat exchanger also immersed in said chamber and operatively connected to said steam generator for transferring heat from said chamber to said steam generator by means of a gaseous medium flowing from said secondary heat exchanger.

2. A plant according to claim 1, wherein said steam generator and said secondary heat exchanger are connected for recirculating flow, further comprising means for regulating the rate of flow of said gaseous medium to thereby control the rate of steam generation.

3. A plant according to claim 1, wherein means operatively associated with said steam generator and said secondary heat exchanger are provided for regulating the pressure of said gaseous medium to thereby control the rate of steam generation.

4. A plant according to claim 1, wherein said gaseous medium is air received from the air flow of said gas turbine.

5. A plant according to claim 1, further comprising means for regulating the temperature of combustion gases leaving said fluidized bed and means for mixing cooler air with said combustion gases to achieve a desired temperature prior to admitting said gases to said gas turbine, thereby to control the power level of said gas turbine.

6. A method of operating a gas turbine plant of the type having a fluidized bed combustion chamber, in combination with a steam turbine plant of the type having a steam generator, comprising the steps of:
   providing a flow of air for said gas turbine plant;
   directing at least a portion of said flow of air into heat exchange relation with said combustion chamber prior to admitting it to said turbine;
   providing a flow of gaseous medium for transmitting heat to said steam generator;
   directing at least a portion of said flow of gaseous medium into heat exchange relationship with said combustion chamber prior to admitting it to said steam generator.

7. A method according to claim 6, further comprising the step of regulating the rate of flow of said gaseous medium to thereby control the rate of steam generation in said steam generator.

8. A method according to claim 6, further comprising the step of regulating the pressure of said gaseous medium to thereby control the rate of steam generation in said steam generator.

9. A method according to claim 6, wherein said flow of gaseous medium is drawn from said flow of air.

10. A method according to claim 6, further comprising the steps of regulating the temperature of combustion gases leaving said combustion chamber; and mixing cooler gases from said flow of air and said portion of said flow of air with said combustion gases to achieve a desired temperature prior to admitting said gases to said gas turbine, to thereby control the power level of said gas turbine.

* * * * *